US012479192B2

United States Patent
Kwak et al.

(10) Patent No.: US 12,479,192 B2
(45) Date of Patent: *Nov. 25, 2025

(54) ZINC-BASED COATED STEEL MATERIAL HAVING EXCELLENT CORROSION RESISTANCE AND SPOT WELDABILITY

(71) Applicant: POSCO, Pohang-si (KR)

(72) Inventors: Young-Jin Kwak, Gwangyang-si (KR); Woo-Sung Jung, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/787,182

(22) PCT Filed: Dec. 3, 2020

(86) PCT No.: PCT/KR2020/017515
§ 371 (c)(1),
(2) Date: Jun. 17, 2022

(87) PCT Pub. No.: WO2021/125636
PCT Pub. Date: Jun. 24, 2021

(65) Prior Publication Data
US 2023/0030466 A1    Feb. 2, 2023

(30) Foreign Application Priority Data

Dec. 20, 2019 (KR) .................. 10-2019-0171333

(51) Int. Cl.
*B32B 15/01* (2006.01)
*C22C 18/00* (2006.01)
(Continued)

(52) U.S. Cl.
CPC ............ *B32B 15/013* (2013.01); *C22C 18/00* (2013.01); *C22C 38/002* (2013.01); *C22C 38/02* (2013.01);
(Continued)

(58) Field of Classification Search
CPC ..... B32B 15/013; C22C 18/00; C22C 38/002; C22C 38/02; C22C 38/04; C22C 38/06;
(Continued)

(56) References Cited

U.S. PATENT DOCUMENTS

| 2015/0013409 A1 | 1/2015 | Monnoyer et al. |
| 2020/0002803 A1 | 1/2020 | Kwak et al. |
| 2021/0002772 A1 | 1/2021 | Kwak et al. |

FOREIGN PATENT DOCUMENTS

| CN | 110114501 A | 8/2019 |
| EP | 3561147 A1 | 10/2019 |

(Continued)

OTHER PUBLICATIONS

Office Action issued in Chinese patent application 202080088899.0 dated Mar. 24, 2023.
(Continued)

*Primary Examiner* — Katherine A Christy
(74) *Attorney, Agent, or Firm* — Morgan Lewis & Bockius LLP (57) ABSTRACT

A zinc-based coated steel material includes: a base steel; and a multilayer zinc-based plating layer composed of two or more discriminated plating layers, wherein the multilayer zinc-based plating layer includes Mg at a ratio of 0.12 to 0.64 percent by weight to the entire multi-plating layer, and the multilayer zinc-based plating layer includes a first plating layer, a second plating layer, a third plating layer sequentially from an interface with the base steel, and the second plating layer is a Zn—Mg alloy layer including Mg of 0.4 to 0.9 percent by weight, and an adhesion amount of the second plating layer is 9 to 15 g/m$^2$.

10 Claims, 2 Drawing Sheets

(51) Int. Cl.
  *C22C 38/00* (2006.01)
  *C22C 38/02* (2006.01)
  *C22C 38/04* (2006.01)
  *C22C 38/06* (2006.01)
  *C23C 14/16* (2006.01)
  *C23C 14/26* (2006.01)

(52) U.S. Cl.
  CPC .............. *C22C 38/04* (2013.01); *C22C 38/06* (2013.01); *C23C 14/16* (2013.01); *C23C 14/26* (2013.01); *C21D 2211/001* (2013.01); *C21D 2211/008* (2013.01)

(58) Field of Classification Search
  CPC .............. C23C 14/16; C21D 2211/001; C21D 2211/008
  USPC ........................................................ 428/659
  See application file for complete search history.

(56) References Cited

FOREIGN PATENT DOCUMENTS

| | | |
|---|---|---|
| JP | S54-159340 A | 12/1979 |
| JP | H02-141588 A | 5/1990 |
| JP | H04-41683 A | 2/1992 |
| JP | H09-143657 A | 6/1997 |
| JP | H09-228030 A | 9/1997 |
| KR | 10-2013-0060591 A | 6/2013 |
| KR | 10-2015-0071883 A | 6/2015 |
| KR | 10-2018-0075429 A | 7/2018 |
| KR | 10-2019-0078399 A | 7/2019 |
| WO | WO-2013091889 A1 * | 6/2013 ........... C23C 14/025 |
| WO | 2017-078195 A1 | 5/2017 |
| WO | 2018-117701 A1 | 6/2018 |
| WO | WO-2018124649 A1 * | 7/2018 ............. B32B 15/01 |
| WO | 2018-199362 A1 | 11/2018 |
| WO | 2019-132339 A1 | 7/2019 |

OTHER PUBLICATIONS

Extended Search Report issued in patent application 20901232.7 dated May 17, 2023.

International Search Report dated Mar. 5, 2021 issued in International Patent Application No. PCT/KR2020/017515 (with English translation).

Office Action issued Jun. 27, 2023 for counterpart Japanese Patent Application No. 2022-536983.

* cited by examiner

ND STEEL MATERIAL
ZINC-BASED COATED STEEL MATERIAL HAVING EXCELLENT CORROSION RESISTANCE AND SPOT WELDABILITY

CROSS-REFERENCE OF RELATED APPLICATIONS

This application is the U.S. National Phase under 35 U.S.C. § 371 of International Patent Application No. PCT/KR2020/017515, filed on Dec. 3, 2020, which in turn claims the benefit of Korean Application No. 10-2019-0171333, filed on Dec. 20, 2019, the entire disclosures of which applications are incorporated by reference herein.

TECHNICAL FIELD

The present disclosure relates to a zinc-based coated steel material having excellent corrosion resistance and spot weldability and, more particularly, to a zinc-based coated steel material plated with a multilayer zinc alloy, having two or more layers, and having excellent corrosion resistance and spot weldability.

BACKGROUND ART

Galvanizing suppressing corrosion of iron through cathodic protection is widely used for manufacturing steel materials having high anti-corrosion characteristics because it has excellent corrosion protective properties and economic efficiency, and demand for galvanized steel materials plated with zinc are being increased throughout the vehicle, home appliance, construction material, etc. industries.

Such a galvanized steel material has the property of sacrificial corrosion protection suppressing corrosion of a steel material due to earlier corrosion of zinc with oxidation-reduction potential lower than that of iron when they are exposed to a corrosive environment, and dense corrosive productions are formed on the surface of a steel material due to oxidation of zinc of the plating layer, so the steel material is isolated from an oxidation atmosphere, whereby corrosion resistance of the steel material is improved.

However, as air pollution increases, a corrosive environment gets worse, and strict regulations are applied to save resources and energy with industrial advancement, so it is increasingly required to develop a steel material having excellent corrosion resistance more than existing galvanized steel materials. As a part thereof, a study of a zinc-based coated steel material manufacturing technique that improves corrosion resistance of a steel material by adding elements such as magnesium (Mg) to a plating layer is conducted in various ways.

Meanwhile, a galvanized steel material or a zinc alloy coated steel material (hereafter, referred to as a 'zinc-based coated steel material) is used as a product generally by being machined into a part by machining, etc., and then welded by spot welding, etc. Zinc-based coated steel materials that has, as a base, a high-strength steel material, a high P-added high-strength interstitial free (IF) steel material, etc. that include austenite or retained austenite have a problem that so-called Liquid Metal Embrittlement (LME) in which zinc in a molten state causes brittle cracks by permeating along a base steel grain boundary in spot welding is generated.

Figure 1:
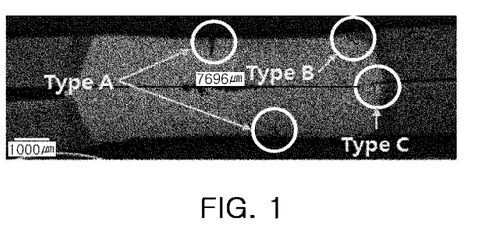
FIG. 1 is a picture enlarged for observing the cross-section of a welded portion of a welding member with LME cracks due to spot welding.

FIG. 1 is a picture enlarged for observing a welded portion of a welding member with LME cracks due to spot welding. In FIG. 1, the cracks generated over and under the nugget are classified as Type A, the crack generated at the welding shoulder is classified as Type B, and the crack generated in the steel sheet is classified as Type C. The cracks of Types B and C of the cracks has a great influence on the rigidity of a material, so it is the most important matter in the field to prevent generation of cracks in welding.

Further, Physical Vapor Deposition (PVD) including vacuum deposition is applied to zinc-based coated steel materials, depending on cases. However, a galvanized layer formed by PVD grows into a columnar structure, so empty spaces may be formed between growing columns, which may cause a problem of deterioration of density of the plating layer. Such a galvanized layer with low density has a problem that hardness is low and galling resistance is decreased.

Further, zinc-based coated steel materials may have a problem that the plating layer is separated from a base steel in machining because adhesion to the base steel is deteriorated, depending on the composition of the plating layer.

DISCLOSURE

Technical Problem

According to an aspect of the present disclosure, it is possible to provide a zinc-based coated steel material having excellent corrosion resistance and spot weldability.

According to another aspect of the present disclosure, it is possible to provide a zinc-based coated steel material having excellent galling resistance.

According to another aspect of the present disclosure, it is possible to provide a zinc-based coated steel material having excellent adhesion of a plating layer and a base steel.

The objectives of the present disclosure are not limited to those described above. Those skilled in the art may understand additional objectives of the present disclosure without difficulty from the specification.

Technical Solution

A zinc-based coated steel material according to an aspect of the present disclosure includes: a base steel; and a multilayer zinc-based plating layer composed of two or more discriminated plating layers, in which the multilayer zinc-based plating layer may include Mg of 0.16~0.78 percent by weight.

A method of manufacturing a galvanized steel material according to another aspect of the present disclosure includes: preparing a base steel; and sequentially forming a multilayer zinc-based plating layer composed of two or more discriminated plating layers on the base steel, in which the multilayer zinc-based plating layer may include Mg of 0.12~0.64 percent by weight.

Advantageous Effects

According to an aspect of the present disclosure, it is possible to provide a zinc-based coated steel material having excellent corrosion resistance and spot weldability by forming a galvanized layer in multiple layers and controlling the characteristics of the layers under specific conditions of the present disclosure. Further, according to another aspect of the present disclosure, it is possible to improve galling resistance by forming a zinc-based plating layer including a zinc-alloy plating layer including a very small amount of MG in multiple layers and controlling rigidity some of the layers. Further, in another aspect of the present disclosure, it is possible to provide a galvanized steel material having excellent adhesion with a base steel even though including a rigid layer by controlling the layer configuration of a plating layer.

BEST MODE

Hereafter, a zinc-based coated steel material having excellent corrosion resistance and spot weldability of the present disclosure is described. The top and bottom of a steel sheet can be freely changed in accordance with the placed state, so it should be noted that an expression 'on', for example, an expression 'on a base steel' means only that a component is in contact with the base steel rather than the component is positioned vertically on the base steel in the present disclosure. Further, it should be noted that the contents of elements are based on weight unless specifically stated in the present disclosure.

A zinc-based coated steel material of the present disclosure includes a base steel and a multi-plating layer formed on the base steel. The type of the base steel is not specifically limited and, for example, may be a steel sheet or a steel wire in the present disclosure. A multi-layer stated in the present disclosure means that there are several layers that are discriminated on the basis of the composition or the structure. According to an embodiment of the present disclosure, individual layers constituting a multi-layer may be formed by physical vapor deposition (PVD), etc., variation of the composition of the same layer is very small for the characteristics of the processes, so different layers can be easily discriminated. However, since heat is applied to a plating layer in the process forming layers or before/after layers are formed, the boundary of two layers may be slightly obscured by diffusion between the two layers in some case, but the present disclosure may include even these cases. However, in these cases, the middle portion of the region obscured by diffusion may be selected as the boundary of two layers. However, methods other than PVC is not excluded from the scope of the present disclosure as long as layers are clearly discriminated within the range described above.

Further, conditions of a base steel (a steel material) are also not specifically limited in the present disclosure. However, since problems due to LME in spot welding are usually generated in high-strength steel materials having strength of 980 Mpa or more, an embodiment of the present disclosure can be more advantageously applied to high-strength steel materials having strength of 1,200 MPa or more. It is not necessary to specifically determine the upper limit of the strength of a high-strength steel material that is a target, but the upper limit may be defined as 1,800 MPa if common steel materials are targets.

Further, the base steel of a high-strength steel material is not necessarily limited thereto, but may include one or more selected from austenite, retained austenite, and martensite as a microstructure.

Further, the base steel is not necessarily limited thereto and a base steel having composition of, in percent by weight, C: 0.10~1.0%, Si: 0.5~3%, Mn: 1.0~25%, Al: 0.01~10%, P: 0.1% or less, S: 0.01% or less, and Fe and unavoidable impurities as the balance may be exemplified as the base steel that can be applied to an embodiment of the present disclosure. Further, in this case, the contents of C, Si, Mn, P, and S can satisfy the following Relation 1.

[C]+[Mn]/20+[Si]/30+2[P]+4[S]≥0.3    [Relation 1]

(where, [C], [Mn], [Si], [P] and [S] mean the contents (percent by weight) of corresponding elements, respectively)

When the alloy composition and microstructure described above are given, liquid metal embrittlement (LME) may be usually a problem in spot welding, and the reasons are as follows. That is, an austenite or retained austenite structure has a weak grain boundary in comparison to other structure, so when stress acts due to spot welding, liquid-state molten zinc permeates the grain boundary of an austenite or retained austenite structure on a welded portion and causes cracks, thereby causing LME that is brittle fracture.

However, as will be described below, since the remaining time of liquid-state molten zinc is minimized in the present disclosure, LME is effectively suppressed even though a zinc-based coated steel material is manufactured using a steel material having the composition and microstructure described above as a base. However, it is apparent that even if the alloy composition of a base steel does not satisfy the range described above, the present disclosure can be applied.

The present disclosure addresses a zinc-based coated steel material in which Mg is added to a zinc-based plating layer to further improve corrosion resistance of zinc-based coated steel materials. When Mg is added to a galvanized layer, corrosion resistance of the plating layer can be further improved. However, as shown in FIG. 2, when Mg is added to a galvanized layer, the melting point of the plating layer decreases and fluidity of the plating layer increases in welding due to the decreased melting point, so permeation along a grain boundary becomes easy.

As the result of a profound study for solve this problem, inventors of the present disclosure found out that when a zinc-based plating layer composed of two or more discriminated plating layers is formed on a base steel, corrosion resistance is secured and problems such as LME are not generated in welding, and has ended up the present disclosure.

The present disclosure relates to a zinc-based coated steel material in which a zinc-based plating layer including a zinc alloy layer including two or more zinc layers or a very small amount of Mg is formed on the surface of a base steel, in which the structure of the plating layer is designed to be able to secure corrosion resistance by adding an appropriate amount of Mg to only some layers while decreasing the content of Mg in the zinc-based plating layer. In this case, the zinc-based plating layer of the present disclosure includes Mg at a ratio of 0.12~0.64% to the weight of the entire multi-plating layer and includes at least one layer including Mg of 0.4~0.9 percent by weight. When the Mg content to the weight of the entire multi-plating layer is insufficient, corrosion resistance may not be sufficiently secured. On the contrary, when the Mg content is excessively high, spot weldability may be poor, so the Mg content to the weight of the entire multi-plating layer may be determined the range described above.

Figure 2:
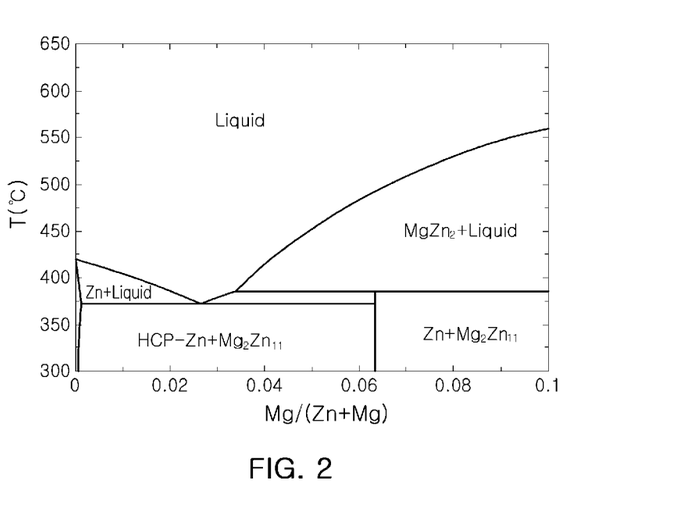
FIG. 2 is a portion of a zinc-magnesium binary phase diagram.

That is, as can be seen from FIG. 2, when the Mg content in the entire plating layer is increased to improve corrosion resistance from the point at which the zinc content is 100%, there is a region in which a melting point greatly decreases, so LME is very easily generated. In order to solve this problem, a relatively high content of Mg is added to only some layers to contribute the securing corrosion resistance and Mg is not added or a very small amount of Mg is added to the other layers so that the Mg content in the entire alloy plating layer is not high. Since plating layers are melted and mixed in welding, even if the Mg content is slightly high in some plating layers, Mg is diluted to a lower content in the molten plating due to the content in the entire plating layer or diffusion of Fe, and as a result, the melting point of the molten plating does not greatly decrease. Accordingly, when controlling the layer structure of a zinc-based plating layer in accordance with an embodiment of the present disclosure, it is possible to achieve both corrosion resistance and spot weldability.

According to an embodiment of the present disclosure, the zinc-based plating layer may be attached in a small amount of 35 $g/m^2$ or less per one side (which means the amount of plating layers per unit area of a base steel in the total adhesion amount of the entire layer). The adhesion amount is a value greatly smaller than 60 $g/m^2$ that is a common galvanizing adhesion amount of a hot-dip galvanized steel sheet (GI sheet), and it is possible to further decrease the possibility of LME in spot welding by decreasing the adhesion amount in this way. Accordingly, the adhesion amount of a zinc-based plating layer may be 35 $g/m^2$ or less in an embodiment of the present disclosure. However, when the adhesion amount is excessive, corrosion resistance may not be sufficiently secured, so the adhesion amount may be 15 $g/m^2$.

Figure 3:
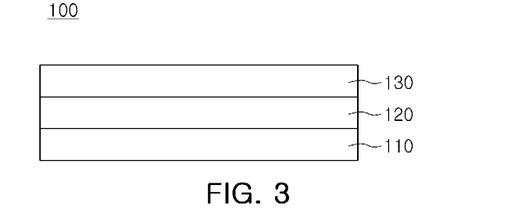
FIG. 3 is a schematic diagram showing a layer structure of a zinc-based multi-plating layer of a zinc-based coated steel material that is obtained in accordance with an embodiment of the present disclosure.

In an embodiment of the present disclosure shown in FIG. 3, a zinc-based plating layer 100 may have a three-layered structure composed of first to third plating layers 110 to 130 sequentially from the interface with a base steel, and the Mg content in the second plating layer 120 of the three layers may be 0.4~0.9 percent by weight. It is possible to secure corrosion resistance of the entire zinc-based plating layer by controlling the Mg content in the second plating layer 120 at 0.4 percent by weight or more. Further, it is possible to improve spot weldability of the galvanized layer by controlling the Mg content in the second plating layer 120 at 0.9 percent by weight or less.

It is preferable that the first plating layer 110 and the third plating layer 130 may have an Mg content of 0.1 percent or less by weight or less to be able to show the function of each layer to be described below, and may be substantially pure Zn layers not including Mg. However, it should noted that even if they are pure Zn layers, other elements (Mg may also be included in the other elements) at an impurity level are not excluded.

It is possible to improve plating adhesion by forming the first plating layer 110 on the interface with the base steel. That is, the second plating layer 120 including Mg of 0.4~0.9 percent by weight is a relatively hard layer and may not easily adhere to the base steel, but it is possible to improve adhesion of the plating layer when forming a first plating layer 110 that includes Mg at a low content or is a pure Zn layer between the second plating layer 120 and the base steel. Further, the third plating layer 130 is possible to suppress blackening of a steel sheet surface. Mg, which is a high oxidative element, has a tendency of easily producing an oxide or a hydroxide, so surface roughness may be changed and blackening may be generated. It is possible to prevent blackening by applying a third plating layer including Mg at a low content as the outermost surface. In addition, when the adhesion amount of the third plating layer 130 is controlled at a predetermined level or more, a uniform phosphate film can be formed on the surface of a coated steel sheet, so when the third plating layer is used for vehicles, excellent phosphating property and sealer adhesion can be expected.

According to an embodiment of the present disclosure, the adhesion amount of the second plating layer 120 for obtaining a corrosion resistance effect according to the second plating layer 120 may be 8 $g/m^2$ or more. However, when the adhesion amount of the second plating layer is excessive, the adhesion amounts of other plating layers relatively decrease, so not only it is difficult to obtain an advantageous effect and the steel material may be vulnerable to LME due to a drop of the melting point of the molten plating in welding. Accordingly, the adhesion amount of the second plating layer 120 may be limited at 16 $g/m^2$ or less. According to another embodiment of the present disclosure, the adhesion amount of the second plating layer 120 may be 9~15 $g/m^2$, and may be 11~13 $g/m^2$ in another embodiment.

Further, the adhesion amounts of the first plating layer 110 and the third plating layer 130 each may be 3 $g/m^2$ or less to expect their functions. However, when the adhesion amounts of the plating layers are excessively increased, the adhesion amount of the second plating layer 120 may be limited, so the upper limits of the plating layers each may be determined at 14 $g/m^2$ and may be determined at 10 $g/m^2$ in an embodiment. In another embodiment of the present disclosure, the adhesion amount of one or all of the first plating layer 110 and the third plating layer 130 may be 3~10 $g/m^2$, and may be 6~8 $g/m^2$ in another embodiment.

The zinc-based plating layer of the present disclosure may be effective to prevent LME in welding in comparison to common hot-dip galvanized (GI) steel sheets also in terms of composition. The reason is because common hot-dip galvanized steel sheets include a small amount of aluminum and an inhibition layer that interferes with alloying between a plating layer and a base steel is formed due to the aluminum. When spot welding is performed with such an inhibition layer existing, alloying with iron is delayed, and accordingly, a molten plating with a low melting point is produced, so the molten plating can easily permeate to the grain boundary. However, when an alloy layer including Mg exists, as in the present disclosure, a inhibition layer is not formed, so alloying with iron is promoted, and accordingly, the melting point of a plating (a molten plating) increases, which may be effect to prevent LME.

As described above, the zinc-based coated steel material according to an embodiment of the present disclosure may have excellent spot weldability because it has high resistance against cracks, and for example, when spot welding is performed under SEP 1220-2, the average length of cracks can be controlled at 0.1 or less times the thickness of the base steel.

The zinc-based coated steel material according to an embodiment of the present disclosure is not necessarily limited thereto and may be manufactured by plating a steel sheet surface through physical vapor deposition (PVD) including vacuum deposition. Although will be described in more detail below, vacuum deposition means a method of performing deposition by producing vapor by heating a coating material in a vacuum chamber and then by ejecting the vapor to the surface of a base steel. When physical vapor deposition is applied, an inhibition layer that is generated in the process of hot-dip plating can be reduced or prevented. The inhibition layer serves to increase the time for which a plating layer is maintained at a low melting point by suppressing alloying between a base layer and a plating layer in a heating process such as welding, so the inhibition layer is disadvantageous in terms of securing weldability. However, as described above, since physical vapor deposition such as vacuum deposition reduces or prevents a inhibition layer, a Fe—Zn alloy phase such as $Fe_{11}Zn_{40}$ having a higher melting point than a zinc melting point (419° C.) is easily formed, so a plating layer formed by physical vapor deposition may be more advantageous in terms of securing spot weldability.

When a zinc-based coated steel material is manufactured through such vacuum deposition, grains are formed on column shapes toward the surface of a plating layer for the characteristics of the deposition process, that is, columnar grains are formed. In this case, the grains are not densely formed, so galling may be generated in forming such as pressing. However, when a plating layer including Mg of 0.4~0.9 percent by weight is included as one layer of multi-plating layers in accordance with an embodiment of the present disclosure, galling can be remarkably reduced. That is, when a small amount of Mg is included in a plating layer, the hardness of the plating layer increases, so it is possible to prevent galling.

The zinc-based coated layer according to an embodiment of the present disclosure may be manufactured by various methods and the manufacturing method is not specifically limited. However, according to an embodiment of the present disclosure, at least one layer of discriminated plating layers constituting the zinc-based multi-plating layer may be formed by physical vapor deposition (PVD), and preferably, may be formed by vacuum deposition. In this case, the plating layer formed by physical vapor deposition may be a layer including Mg of 0.4 percent by weight or more (the second plating layer according to an embodiment). Further, according to an embodiment of the present disclosure, all of the plating layers constituting the zinc-based multi-plating layer may be formed by physical vapor deposition, preferably vacuum deposition. In detail, according to an embodiment of the present disclosure, the zinc-based plating layer of the present disclosure may be formed by the following method.

First, a base steel is prepared, the base steel is pickled using an HCl solution of 14 percent or more by weight, rinsed, and dried, contaminants and a natural oxidation film on the surface are removed using plasma and an ion beam, and then multiple plating layers are sequentially formed, whereby the zinc-based coated steel material of the present disclosure can be manufactured.

In this case, the multiple plating layers each may be formed by electroplating or common vacuum deposition, for example, electron beam, sputtering, thermal evaporation, induction heating evaporation, ion plating, etc., but a Mg plating layer or Zn—Mg-alloy plating layer of the multiple plating layers may be formed by electro-magnetic heating physical vapor deposition having an electromagnetic stirring effect.

Figure 4:
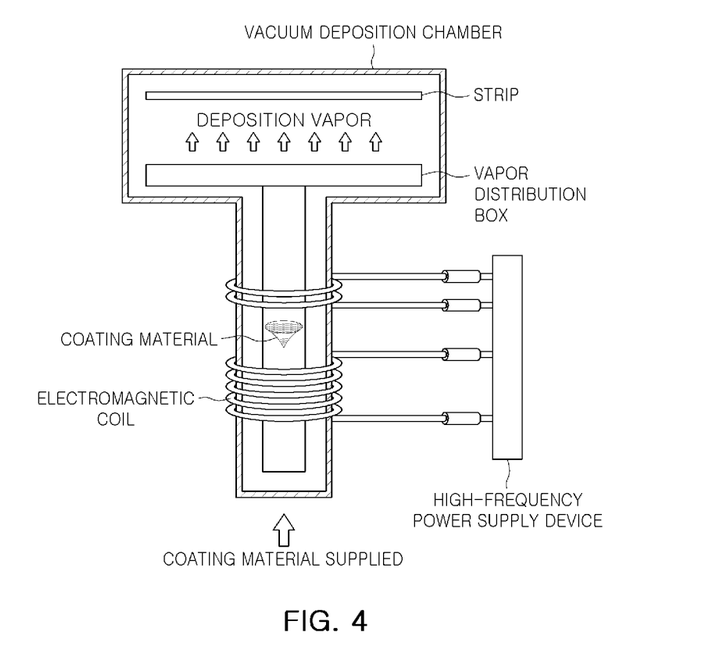
FIG. 4 is a schematic diagram of an apparatus for electromagnetic heating physical vapor deposition.

The electro-magnetic heating physical vapor deposition uses a phenomenon in which an electromagnetic force is generated by applying high-frequency power to a pair of electromagnetic coils that generate an AC electromagnetic field, a coating material (Zn, Mg, or a Zn—Mg alloy in the present disclosure) is heated in a space surrounded by the AC electromagnetic field, and the heated coating material produces a large amount of deposition vapor (metal vapor). A schematic diagram of an apparatus for such electro-magnetic heating physical vapor deposition is shown in FIG. 4. Referring to FIG. 4, a large amount of deposition vapor produced in the way described above is sprayed at a high speed to the surface of a base steel through a plurality of nozzles of a vapor distribution box, whereby a plating layer is formed.

According to a common vacuum deposition apparatus, a coating material is provided in a crucible and is evaporated by heating the crucible receiving the coating material. In this case, it is difficult to sufficiently transmit heat energy to the coating material due to melting of the crucible, a loss of heat by the crucible, etc. Accordingly, not only the deposition speed is low, but there is a certain limitation in micronization of grains. Further, when it is intended to deposit Zn—Mg alloy vapor, as in the present disclosure, there is also a certain level of limitation in securing homogeneity of plating layers.

However, when deposition is performed by electro-magnetic heating physical vapor deposition, unlike common vacuum deposition, it is possible to more quickly expose a coating material to high temperature without limitation according to temperature. Accordingly, there is an advantage that not only high-speed deposition is possible, but it is possible to achieve micronization of grains constituting resultant plating layers and homogenization of element distribution in the plating layers.

In deposition, it is preferable to adjust the degree of vacuum in a vacuum deposition chamber at $1.0\times10^{-3}$ mbar to $1.0\times10^{-5}$ mbar, and in this case, it is possible to effectively prevent an increase of brittleness and deterioration of properties due to oxides that are produced in the process of forming plating layers.

In deposition, the temperature of a coating material that is heated is controlled preferably at 700° C. or more, more preferably 800° C. or more, and further more preferably 1000° C. or more. If the temperature is under 700° C., the effect of micronization of grains and homogenization of plating layers may not be sufficiently secured. Meanwhile, the higher the temperature of a coating material that is heated, the more it is advantageous in terms of achieving the intended technical effects, and the upper limit is not specifically limited in the present disclosure, but when the temperature is a predetermined level or more, not only the effect is saturated, but the process cost is excessively increased. Accordingly, the upper limit may be limited to 1500° C. in consideration of this problem.

It is preferable to adjust the temperature of the base material at 100° C. or less before and after deposition, and if the temperature exceeds 100° C., rebound in a width direction due to non-uniformity of temperature of a width steel sheet may interfere with maintaining the degree of vacuum when the base steel passes through a output-side multi-stage weighted pressure system.

Mode for Invention

Hereafter, the present disclosure is described in more detail through embodiments. However, it should be noted that the following embodiment does not intent to limit the right range of the present disclosure. This is because the right range of the present disclosure is determined the matters described in claims and matters reasonably inferred from the matters.

EMBODIMENT

An automotive high-strength cold-rolled steel sheet including C: 0.18%, Si: 1.5Mn: 3.5%, Al: 0.01P: 0.006%, S: 0.003%, and Fe and unavoidable impurities as the balance in percent by weight and having a thickness of 1.4 mm was prepared, and a multi-layer zinc-based coated steel material having multiple plating layers under the conditions of the following Table 1 was manufactured using the apparatus (the degree of vacuum of 3.2×10⁻³ mbar) of FIG. 4. In all examples, the plating layer of each layer was obtained through a separate process in a separate vacuum chamber, and when the plating layer of each layer was formed, the current applied to a pair of electromagnetic coils was 1.2 kA, the frequency applied to the pair of electromagnetic coils was 60 kHz for a deposition material of 2 kg, the temperature of the heated coating material was 1000° C., and the temperature of the vapor distribution box was 900° C. as the same conditions. Further, the temperature of the base steel was maintained at 60° C. after deposition of the plating layer of each layer.

Next, the adhesion amount and the weight ratio of Mg of a multilayer zinc-based coated steel material manufactured by an Inductively Coupled Plasma (ICP) method were measured. In more detail, the base material was cut into specimens of 80 mm×80 mm, the surface was degreased and primary grammage was measured using a high-precision balance ($W_1$: 0.0000 g). Thereafter, an O-Ring 54.5 mm (dia) exclusive column was attached to the front through a clamp to prevent leakage of a solution. Thereafter, a 1:3 HCl solution of 30 was injected and an inhibitor of 2~3 drops was added. After production of $H_2$ gas on the surface was finished, the solution was captured in a 100 cc volumetric flask. In this case, the remains on the surface were all captured at 100 cc or less using a washing bottom. Thereafter, the specimens were completely dried, secondary grammage ($W_2$) was measured, and a value obtained by dividing the difference of a primary grammage value and a secondary grammage value by a unit area was selected as the total adhesion amount. Meanwhile, a Mg content in the captured solution was measured through an ICP method and was selected as the weight ratio of Mg, and the result was shown in Table 1. As shown in Table 1, the first plating layer and the third plating layer were pure Zn plating layers and had composition substantially not including other elements except for Zn, and the second plating layer had Zn—Mg ally composition additionally including Mg.

Next, weldability, corrosion resistance, sealer adhesion, phosphating property, and anti-blackening of the manufactured multilayer zinc-based coated steel materials were evaluated, and the result was shown in the following Table 2.

In more detail, each zinc-based coated steel material was cut into a specimen of 75 mm×150 mm and then initial red rust generation time was measured by performing a saltspray corrosion test under JIS Z2371, whereby corrosion resistance was measured on the basis of the following references.
1. Good: a case in which red rust generation time was two times or more in comparison to galvanized steel sheet (GI steel sheet) having a one-side adhesion amount of 60 g/m²
2. Medium: a case in which red rust generation time was the same level or less than two times in comparison to galvanized steel sheet (GI steel sheet) having a one-side adhesion amount of 60 g/m²
3. Poor: a case in which red rust generation time was short in comparison to galvanized steel sheet (GI steel sheet) having a one-side adhesion amount of 60 g/m²

Each zinc-based coated steel material was cut into a specimen of 40 mm×120 mm under SEP 1220-2, spot welding was performed 100 times on each specimen, and then whether there was a Type B crack was observed and the size was measured, whereby weldability was evaluated on the basis of the following references.

1. Very good: a case in which a Type B crack was not generated in all of the specimens
2. Good: a case in which Type B cracks were generated in some or all of the specimens and the average length of the Type B cracks was 0.1 or less times the thickness of the base steels (cold-rolled steel sheets)
3. Medium: a case in which Type B cracks were generated in some or all of the specimens and the average length of the Type B cracks was larger than 0.1 times and 0.2 or less times the thickness of the base steels (cold-rolled steel sheets)
4. Poor: a case in which Type B cracks were generated in some or all of the specimens and the average length of the Type B cracks was larger than 0.2 times the thickness of the base steels (cold-rolled steel sheets)

Meanwhile, galling resistance was checked by measuring a friction rotation number until the friction rotation number exceeded 0.3 while rotating steel balls, which was made of chrome-plated mold steel for cold working on the specimens under load of 5 MPa at a speed of 200 mm/s in a dripped state.
Good: the friction rotation number was 80 or more until a friction coefficient exceeded 0.3
Medium: the friction rotation number was 60 or more and less than 80 until a friction coefficient exceeded 0.3
Poor: the friction rotation number was less than 60 until a friction coefficient exceeded 0.3

In order to check plating adhesion, a multilayer zinc-based coated steel material as cut into specimens of 40 mm×80 mm, the specimens were loaded on press tester, a 60° bending test was performed, the specimens were unloaded from the test, a cellophane tape was attached to the bending portion, the tape was removed, the removed tape was attached to a white paper, and a separation width was measured, whereby plating adhesion was evaluated on the basis of the following references.
1. Good: a case in which the separation width was 6.0 mm or less
2. Medium: a case in which the separation width was larger than 6.0 mm and 8.0 mm or less
3. Poor: a case in which the separation width was larger than 8.0 mm As for the phosphating property, a multilayer zinc-based coated steel material was cut into specimens of 75 mm×150 mm, surface regulation and phosphating were performed in accordance with the dimensions of common vehicles, and the phosphate uniformity was measured.
1. Good: phosphate film was uniformly formed
2. Poor: phosphate film was non-uniformly formed A multilayer zinc-based coated steel material was cut into specimens of 75 mm×150 mm, pressurized adhesive specimens were left for 120 hours at pressure of 10~20 kgf/cm in a thermo-hygrostat in which 50° C. and relative humidity (RH) of 95% were maintained, and color variation ($\Delta E$) before and after tests was measured, whereby anti-blackening was evaluated on the basis of the following references.
1. Good: $\Delta E \leq 3$
2. Medium: $3 < \Delta E \leq 5$
3. Poor: $\Delta E > 5$

TABLE 1

| Items | ① | ② | ③ | ④ | ⑤ | ⑥ | ⑦ | ⑧ | ⑨ |
|---|---|---|---|---|---|---|---|---|---|
| Example 1 | 0.10 | 35 | 3 | 0 | 13 | 0.4 | 9 | 0 | 13 |
| Example 2 | 0.67 | 21 | 3 | 0.08 | 3 | 0.9 | 15 | 0.08 | 3 |
| Example 3 | 0.40 | 14 | 3 | 0.07 | 3 | 0.68 | 8 | 0 | 3 |
| Example 4 | 0.33 | 36 | 3 | 0.05 | 11 | 0.73 | 15 | 0.02 | 10 |

TABLE 1-continued

| Items | ① | ② | ③ | ④ | ⑤ | ⑥ | ⑦ | ⑧ | ⑨ |
|---|---|---|---|---|---|---|---|---|---|
| Example 5 | 0.24 | 20 | 3 | 0 | 7 | 0.68 | 7 | 0.01 | 6 |
| Example 6 | 0.15 | 23 | 3 | 0 | 7 | 0.3 | 10 | 0.06 | 6 |
| Example 7 | 0.48 | 25 | 3 | 0 | 7 | 1 | 12 | 0 | 6 |
| Example 8 | 0.43 | 22 | 3 | 0 | 2 | 0.68 | 14 | 0 | 6 |
| Example 9 | 0.39 | 28 | 3 | 0.12 | 7 | 0.68 | 15 | 0 | 6 |
| Example 10 | 0.43 | 22 | 3 | 0 | 7 | 0.68 | 14 | 0 | 1 |
| Example 11 | 0.25 | 35 | 3 | 0 | 7 | 0.68 | 13 | 0 | 15 |
| Example 12 | 0.36 | 25 | 3 | 0 | 7 | 0.68 | 12 | 0.13 | 6 |
| Example 13 | 0.32 | 24 | 3 | 0 | 7 | 0.68 | 11 | 0.02 | 6 |
| Example 14 | 0.30 | 23 | 3 | 0 | 7 | 0.68 | 10 | 0.03 | 6 |
| Example 15 | 0.34 | 26 | 3 | 0.01 | 7 | 0.68 | 13 | 0 | 6 |
| Example 16 | 0.28 | 22 | 3 | 0 | 7 | 0.68 | 9 | 0 | 6 |
| Example 17 | 0.35 | 27 | 3 | 0 | 7 | 0.68 | 14 | 0 | 6 |
| Example 18 | 0.34 | 26 | 3 | 0 | 7 | 0.68 | 13 | 0 | 6 |
| Example 19 | 0.33 | 25 | 3 | 0 | 7 | 0.68 | 12 | 0 | 6 |
| Example 20 | 0.24 | 15 | 3 | 0 | 3 | 0.4 | 9 | 0 | 3 |
| Example 21 | 0.29 | 21 | 3 | 0 | 3 | 0.4 | 15 | 0 | 3 |
| Example 22 | 0.12 | 29 | 3 | 0 | 10 | 0.4 | 9 | 0 | 10 |
| Example 23 | 0.17 | 35 | 3 | 0 | 10 | 0.4 | 15 | 0 | 10 |
| Example 24 | 0.54 | 15 | 3 | 0 | 3 | 0.9 | 9 | 0 | 3 |
| Example 25 | 0.64 | 21 | 3 | 0 | 3 | 0.9 | 15 | 0 | 3 |
| Example 26 | 0.28 | 29 | 3 | 0 | 10 | 0.9 | 9 | 0 | 10 |
| Example 27 | 0.39 | 35 | 3 | 0 | 10 | 0.9 | 15 | 0 | 10 |
| Example 28 | 0.30 | 15 | 3 | 0 | 3 | 0.5 | 9 | 0 | 3 |
| Example 29 | 0.36 | 15 | 3 | 0 | 3 | 0.6 | 9 | 0 | 3 |
| Example 30 | 0.42 | 15 | 3 | 0 | 3 | 0.7 | 9 | 0 | 3 |
| Example 31 | 0.48 | 15 | 3 | 0 | 3 | 0.8 | 9 | 0 | 3 |
| Example 32 | 0.36 | 21 | 3 | 0 | 3 | 0.5 | 15 | 0 | 3 |
| Example 33 | 0.43 | 21 | 3 | 0 | 3 | 0.6 | 15 | 0 | 3 |
| Example 34 | 0.50 | 21 | 3 | 0 | 3 | 0.7 | 15 | 0 | 3 |
| Example 35 | 0.57 | 21 | 3 | 0 | 3 | 0.8 | 15 | 0 | 3 |
| Example 36 | 0.20 | 22 | 3 | 0 | 3 | 0.5 | 9 | 0 | 10 |
| Example 37 | 0.25 | 22 | 3 | 0 | 3 | 0.6 | 9 | 0 | 10 |
| Example 38 | 0.29 | 22 | 3 | 0 | 3 | 0.7 | 9 | 0 | 10 |
| Example 39 | 0.33 | 22 | 3 | 0 | 3 | 0.8 | 9 | 0 | 10 |
| Example 40 | 0.27 | 28 | 3 | 0 | 3 | 0.5 | 15 | 0 | 10 |
| Example 41 | 0.32 | 28 | 3 | 0 | 3 | 0.6 | 15 | 0 | 10 |
| Example 42 | 0.38 | 28 | 3 | 0 | 3 | 0.7 | 15 | 0 | 10 |
| Example 43 | 0.43 | 28 | 3 | 0 | 3 | 0.8 | 15 | 0 | 10 |
| Example 44 | 0.26 | 14 | 3 | 0 | 2 | 0.4 | 9 | 0 | 3 |
| Example 45 | 0.28 | 13 | 3 | 0 | 2 | 0.4 | 9 | 0 | 2 |
| Example 46 | 0.21 | 13 | 3 | 0 | 2 | 0.3 | 9 | 0 | 2 |
| Example 47 | 0.35 | 13 | 3 | 0 | 3 | 0.5 | 9 | 0 | 1 |
| Example 48 | 0.24 | 15 | 3 | 0 | 3 | 0.4 | 9 | 0 | 3 |
| Example 49 | 0.64 | 21 | 3 | 0 | 3 | 0.9 | 15 | 0 | 3 |
| Example 50 | 0.28 | 13 | 3 | 0 | 3 | 0.4 | 9 | 0 | 1 |
| Example 51 | 0.71 | 19 | 3 | 0 | 3 | 0.9 | 15 | 0 | 1 | wherein
①: Mg content in entire plating layer,
②: adhesion amount of entire plating layer,
③: the number of plating layers,
④: Mg content in first plating layer,
⑤: adhesion amount of first plating layer,
⑥: Mg content in second plating layer,
⑦: adhesion amount of second plating layer,
⑧: Mg content in third plating layer,
⑨: adhesion amount of third plating layer.
Further, the contents is percent by weight and the adhesion amount is $g/m^2$.

TABLE 2

| Items | Corrosion resistance | Spot weldability | Phosphating property | Galling resistance | Plating adhesion | Anti-blackening |
|---|---|---|---|---|---|---|
| Example 1 | 3 | 1 | 1 | 1 | 1 | 1 |
| Example 2 | 1 | 3 | 1 | 1 | 1 | 1 |
| Example 3 | 3 | 1 | 1 | 1 | 1 | 1 |
| Example 4 | 1 | 4 | 1 | 1 | 1 | 1 |
| Example 5 | 2 | 1 | 1 | 1 | 1 | 1 |
| Example 6 | 2 | 1 | 1 | 3 | 1 | 1 |
| Example 7 | 1 | 2 | 1 | 1 | 1 | 1 |
| Example 8 | 1 | 1 | 1 | 1 | 2 | 1 |

TABLE 2-continued

| Items | Corrosion resistance | Spot weldability | Phosphating property | Galling resistance | Plating adhesion | Anti-blackening |
|---|---|---|---|---|---|---|
| Example 9 | 1 | 1 | 1 | 1 | 3 | 1 |
| Example 10 | 1 | 1 | 1 | 1 | 1 | 2 |
| Example 11 | 1 | 1 | 1 | 2 | 1 | 1 |
| Example 12 | 1 | 1 | 2 | 1 | 1 | 2 |
| Example 13 | 1 | 1 | 1 | 1 | 1 | 1 |
| Example 14 | 1 | 1 | 1 | 1 | 1 | 1 |
| Example 15 | 1 | 1 | 1 | 1 | 1 | 1 |
| Example 16 | 1 | 1 | 1 | 1 | 1 | 1 |
| Example 17 | 1 | 1 | 1 | 1 | 1 | 1 |
| Example 18 | 1 | 1 | 1 | 1 | 1 | 1 |
| Example 19 | 1 | 1 | 1 | 1 | 1 | 1 |
| Example 20 | 1 | 1 | 1 | 1 | 1 | 1 |
| Example 21 | 1 | 1 | 1 | 1 | 1 | 1 |
| Example 22 | 1 | 1 | 1 | 1 | 1 | 1 |
| Example 23 | 1 | 1 | 1 | 1 | 1 | 1 |
| Example 24 | 1 | 1 | 1 | 1 | 1 | 1 |
| Example 25 | 1 | 1 | 1 | 1 | 1 | 1 |
| Example 26 | 1 | 1 | 1 | 1 | 1 | 1 |
| Example 27 | 1 | 1 | 1 | 1 | 1 | 1 |
| Example 28 | 1 | 1 | 1 | 1 | 1 | 1 |
| Example 29 | 1 | 1 | 1 | 1 | 1 | 1 |
| Example 30 | 1 | 1 | 1 | 1 | 1 | 1 |
| Example 31 | 1 | 1 | 1 | 1 | 1 | 1 |
| Example 32 | 1 | 1 | 1 | 1 | 1 | 1 |
| Example 33 | 1 | 1 | 1 | 1 | 1 | 1 |
| Example 34 | 1 | 1 | 1 | 1 | 1 | 1 |
| Example 35 | 1 | 1 | 1 | 1 | 1 | 1 |
| Example 36 | 1 | 1 | 1 | 1 | 1 | 1 |
| Example 37 | 1 | 1 | 1 | 1 | 1 | 1 |
| Example 38 | 1 | 1 | 1 | 1 | 1 | 1 |
| Example 39 | 1 | 1 | 1 | 1 | 1 | 1 |
| Example 40 | 1 | 1 | 1 | 1 | 1 | 1 |
| Example 41 | 1 | 1 | 1 | 1 | 1 | 1 |
| Example 42 | 1 | 1 | 1 | 1 | 1 | 1 |
| Example 43 | 1 | 1 | 1 | 1 | 1 | 1 |
| Example 44 | 2 | 1 | 1 | 1 | 3 | 1 |
| Example 45 | 2 | 1 | 1 | 1 | 3 | 3 |
| Example 46 | 3 | 1 | 1 | 1 | 3 | 3 |

TABLE 2-continued

| Items | Corrosion resistance | Spot weldability | Phosphating property | Galling resistance | Plating adhesion | Anti-blackening |
|---|---|---|---|---|---|---|
| Example 47 | 2 | 1 | 2 | 1 | 1 | 3 |
| Example 48 | 1 | 1 | 1 | 1 | 1 | 1 |
| Example 49 | 1 | 1 | 1 | 1 | 1 | 1 |
| Example 50 | 2 | 1 | 2 | 1 | 1 | 3 |
| Example 51 | 1 | 1 | 2 | 1 | 1 | 3 |

As can be seen from the conditions of Table and the result of Table 2, the example 1 is a case in which the Mg content in the entire plating layer was smaller than the range according to an embodiment of the present disclosure, and it could be found that the corrosion resistance was insufficient. Further, the example 1 is a case in which the Mg content in the entire plating layer was excessive, in which the corrosion resistance was sufficient, but it was vulnerable to LME, so spot weldability was poor.

The example 3 is a case in which the adhesion amount of the entire plating layer was small and sufficient corrosion resistance was not shown, and, in the example 4, the adhesion amount of the entire plating layer was excessive, so spot weldability was poor. The example 8 and the example 44 were cases in which the plating adhesion amounts of the first plating layers were small, and as a result, the plating adhesion was level 2 or level 3.

The example 9 is a case in which the Mg content in the first plating layer was excessive, which also resulted in poor plating adhesion.

The example 45 is a case in which the adhesion amount of the third plating layer was small, and as a result, insufficient plating adhesion and anti-blackening was shown. The example 46 is a case in which the adhesion amount of the third plating layer was insufficient and the Mg content in the second plating layer was also low, and as a result, insufficient anti-blackening and corrosion resistance were shown. Further, the example 47 and the example 50 were cases in which the adhesion amounts of the third plating layers were insufficient, and as a result, insufficient anti-blackening and corrosion resistance were shown. The example 51 was a case in which the Mg content in the entire plating layer was excessive and the adhesion amount of the third plating layer was insufficient, and as a result, spot weldability was slightly insufficient.

The example 12 is a case in which the Mg content in the third plating layer was high, and as a result, anti-blackening was not good.

Further, the example 5 is a case in which the adhesion amount of the second plating layer was smaller than the value determined in the present disclosure, so a slight insufficient result (level 2) was shown, as compared with when corrosion resistance satisfied a predetermined value. The example 6 is a case in which the Mg content in the second plating layer was insufficient, and it could be also found in this case that corrosion resistance was slight insufficient (level 2), as compared with a predetermined value was satisfied. However, the example 7 is a case in which the Mg content in the second plating layer was excessive, in which corrosion resistance was good but spot weldability was level 2.

The example 10 is a case in which the plating adhesion amount of the third plating layer was insufficient and the anti-blackening was level 2. The example 11 is a case in which the adhesion amount of the third plating layer was excessive, and the galling resistance in plating was level 2.

However, in the other examples that satisfy all of the conditions determined in the present disclosure, the corrosion resistance, spot weldability, phosphating property, galling resistance, plating adhesion, and anti-blackening were all the highest. Accordingly, it was possible to see advantageous effects of the present disclosure.

The invention claimed is:

1. A zinc-based coated steel material comprising:
   a base steel; and
   a multilayer zinc-based plating layer composed of two or more discriminated plating layers,
   wherein the multilayer zinc-based plating layer includes Mg at a ratio of 0.25 to 0.64 percent by weight to the entire multi-plating layer, and
   wherein the multilayer zinc-based plating layer includes a first plating layer, a second plating layer, and a third plating layer sequentially from an interface with the base steel, and
   wherein the second plating layer is a Zn—Mg alloy layer including Mg of 0.4 to 0.9 percent by weight, and an adhesion amount of the second plating layer is 9 to 15 g/m$^2$.

2. The zinc-based coated steel material of claim 1, wherein the first plating layer and the third plating layer are Zn layers each including Mg of 0.1 percent or less by weight (including 0 percent by weight).

3. The zinc-based coated steel material of claim 2, wherein an entire adhesion amount of the multilayer zinc-based plating layer is 15 to 35 g/m$^2$.

4. The zinc-based coated steel material of claim 3, wherein adhesion amounts of the first plating layer and the third plating layer are each 3 to 10 g/m$^2$.

5. The zinc-based coated steel material of claim 1, wherein the base steel includes by weight percent, C: 0.10 to 1.0%, Si: 0.5 to 3%, Mn: 1.0 to 25%, Al: 0.01 to 10%, P: 0.1% or less (0% excluded), S: 0.01% or less (0% excluded), and Fe and unavoidable impurities as the balance.

6. The zinc-based coated steel material of claim 5, wherein contents of C, Si, Mn, P, and S included in the base steel satisfy following Relation 1

$$[C]+[Mn]/20+[Si]/30+2[P]+4[S] \geq 0.3 \quad \text{[Relation 1]}$$

where, [C], [Mn], [Si], [P] and [S] mean contents percent by weight of corresponding elements, respectively.

7. The zinc-based coated steel material of claim 1, wherein the base steel includes one or more selected from austenite, retained austenite, and martensite as a microstructure.

8. The zinc-based coated steel material of claim 1, wherein an average length of a Type-B crack is 0.1 times a thickness of the base steel, or less when spot welding is performed under September 1220-2.

9. The zinc-based coated steel material of claim 1, wherein at least one plating layer of the two or more discriminated plating layers constituting the multilayer zinc-based plating layer is formed by physical vapor deposition (PVD).

10. The zinc-based coated steel material of claim 9, wherein the plating layer formed by physical vapor deposition (PVD) is a Zn—Mg alloy layer including Mg of 0.4 to 0.9 percent by weight.

\* \* \* \* \*